(12) United States Patent
Mishra

(10) Patent No.: US 7,187,833 B2
(45) Date of Patent: Mar. 6, 2007

(54) LOW ATTENUATION LARGE EFFECTIVE AREA OPTICAL FIBER

(75) Inventor: Snigdharaj K. Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 10/835,874

(22) Filed: Apr. 29, 2004

(65) Prior Publication Data

US 2005/0244120 A1     Nov. 3, 2005

(51) Int. Cl.
*G02B 6/02*   (2006.01)
*G02B 6/36*   (2006.01)
(52) U.S. Cl. ............................ 385/127; 385/126
(58) Field of Classification Search ......... 385/123–128
See application file for complete search history.

(56) References Cited

U.S. PATENT DOCUMENTS

| | | | |
|---|---|---|---|
| 4,372,647 A | 2/1983 | Okamoto et al. | 350/96.33 |
| 4,439,007 A | 3/1984 | Lazay et al. | 350/96.3 |
| 4,852,968 A | 8/1989 | Reed | 350/96.33 |
| 5,675,690 A | 10/1997 | Nouchi et al. | 385/127 |
| 5,878,182 A | 3/1999 | Peckham | 385/123 |
| 5,999,679 A | 12/1999 | Antos et al. | 385/127 |
| 6,084,993 A | 7/2000 | Mukasa | 385/24 |
| 6,337,942 B1 | 1/2002 | Kato et al. | 385/127 |
| 6,343,175 B1 | 1/2002 | Sasaoka | 385/123 |
| 6,404,967 B2 | 6/2002 | Arai et al. | 385/126 |
| 6,421,490 B1 | 7/2002 | Liu | 385/127 |
| 6,453,101 B1 | 9/2002 | Rousseau et al. | 385/123 |
| 6,456,770 B1 | 9/2002 | Sansonetti et al. | 385/123 |
| 6,483,975 B1 | 11/2002 | Hsu et al. | 385/123 |
| 6,600,862 B2 | 7/2003 | Mukasa | 385/124 |
| 6,614,976 B2 | 9/2003 | Kato et al. | 385/127 |
| 6,658,190 B2 | 12/2003 | Hirano et al. | 385/124 |
| 6,684,016 B2 | 1/2004 | Kim et al. | 385/123 |
| 6,724,966 B2 | 4/2004 | Mukasa | 385/127 |

(Continued)

FOREIGN PATENT DOCUMENTS

EP      0 327 702      8/1989

(Continued)

OTHER PUBLICATIONS

Kato T et al, "*Ultra Low Nonlinearity Low Loss Pure Silica Core Fiber for Long-Haul WDM Transmission*", Proceedings of Electronics Society Meeting, 1999, p. 182, XP002933986.

(Continued)

*Primary Examiner*—Sung Pak
*Assistant Examiner*—Daniel Petkovsek
(74) *Attorney, Agent, or Firm*—Joseph M. Homa

(57) ABSTRACT

An optical waveguide fiber having a multi-segmented core surrounded by a cladding, the core having a central segment and an annular segment surrounding the central segment. The central segment has a positive relative refractive index profile, and the annular segment has a negative relative refractive index profile. The optical fiber exhibits an effective area of greater than about 75 $\mu m^2$ at a wavelength of about 1550 nm, a dispersion slope of less than 0.07 $ps/nm^2/km$ at a wavelength of about 1550 nm, a zero-dispersion wavelength of between about 1290 and 1330 nm, and an attenuation of less than 0.20 dB/km, and preferably less than 0.19 dB/km, at a wavelength of about 1550 nm.

31 Claims, 4 Drawing Sheets

U.S. PATENT DOCUMENTS

| | | | |
|---|---|---|---|
| 6,731,847 B1 | 5/2004 | Kato et al. | 385/127 |
| 6,798,962 B2 | 9/2004 | Berkey et al. | 385/124 |
| 6,801,699 B1 | 10/2004 | Bickham et al. | 385/123 |
| 6,901,196 B2* | 5/2005 | Takahashi et al. | 385/124 |
| 6,904,218 B2 | 6/2005 | Sun et al. | 385/127 |
| 2002/0097970 A1 | 7/2002 | Sasaoka | 385/123 |
| 2002/0186941 A1* | 12/2002 | Hsu et al. | 385/123 |
| 2003/0026566 A1 | 2/2003 | Diep et al. | 385/123 |
| 2003/0190128 A1 | 10/2003 | Jang et al. | 385/124 |
| 2004/0067064 A1 | 4/2004 | McNicol et al. | 398/158 |
| 2004/0141703 A1 | 7/2004 | Oh et al. | 385/123 |
| 2004/0141705 A1 | 7/2004 | Cho et al. | 385/127 |
| 2004/0264896 A1 | 12/2004 | Takahashi et al. | 385/103 |
| 2005/0063655 A1* | 3/2005 | Hebgen et al. | 385/124 |
| 2006/0039665 A1 | 2/2006 | Matsuo et al. | 385/127 |

FOREIGN PATENT DOCUMENTS

| | | |
|---|---|---|
| EP | 0 689 068 | 12/1995 |
| EP | 1 107 027 | 6/2001 |
| EP | 1 124 145 | 8/2001 |
| EP | 1 255 138 | 11/2002 |
| EP | 1 076 250 | 2/2004 |
| WO | WO 2000/52507 | 9/2000 |
| WO | WO 2001/65287 | 9/2001 |
| WO | WO 2003/012501 | 2/2003 |
| WO | WO 2004/092794 | 10/2004 |

OTHER PUBLICATIONS

Kato T et al, "*Ultra-low nonlinearity low-loss pure silica core fibre for long-haul WDM transmission*", Electronics Letters, IEE Stevenage, GB, vol. 35, No. 19, Sep. 16, 1999, pp. 1615-1617, XP006012676.

Lazay P D et al, "*Developments in Single-Mode Fiber Design, Materials, and Performance at Bell Laboratories*", IEEE Journal of Quantum Electronics, IEEE Inc. New York, US, vol. 18, No. 4, Apr. 1, 1982, pp. 504-510, XP000619271.

Reed et al., "*Tailoring Optical characteristics of Dispersion-Shifted lightguides for Applications Near 1.55 μm*", AT&T Technical Journal, American Telephone and Telegraph Co., vol. 65, No. 5, Sep. 1, 1986, pp. 105-122.

Kato et al., "*Low Nonlinearity Dispersion-Shifted Fibers Employing Dual-Shaped Core Profile with Depressed Cladding*", OFC, Optical Fiber Communication Conference Technical Digest Series, 1997, p. 66.

Namihira et al., "*Low Nonlinear Optical Fibers for WDM Transmission*", IEICE Technical Report, May 1999, pp. 61-66.

Kato et al., "*Dispersion Shifted Fiber for WDM Transmission*", IEICE Technical Report, Nov. 1996, pp. 43-48.

Bhagavatula et al., "*Segmented-Core Single-Mode Fibres with Low Loss and Low Dispersion*", Electronics Letters, Apr. 28th, 1983, vol. 19, No. 9, pp. 317-318.

Miya et al., "*Fabrication of Low Dispersion Single-Mode Fibers Over a Wide Spectral Range*", IEEE Journal of Quantum Electronics, vol. QE-17 No. 6, Jun. 1981, pp. 858-861.

Safaai-Jazi et al., "*Evaluation of chromatic dispersion in W-type fibers*", Optics Letters, vol. 14, No. 14, Jul. 15, 1989, pp. 760-762.

Guan et al., "*Multimode Fibers for Compensating Intermodal Dispersion of Graded-Index Multimode Fibers*", Journal of Lightwave Technology, vol. 22, No. 7, Jul. 2004, pp. 1714-1719.

* cited by examiner

LOW ATTENUATION LARGE EFFECTIVE AREA OPTICAL FIBER

BACKGROUND OF THE INVENTION

1. Field of the Invention

The present invention relates to large effective area optical fibers.

2. Technical Background

Known fibers have optical characteristics which are suitable for operation in specific windows. For example, standard single mode transmission fibers, such as the SMF-28™ optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km. LEAF® fiber by Corning Incorporated which has an average zero dispersion wavelength near 1500 nm and a dispersion slope of about 0.08 ps/nm/km at about 1550 nm.

SUMMARY OF THE INVENTION

Disclosed herein is an optical waveguide fiber having a multi-segmented core surrounded by a cladding, the core comprising a central segment extending radially outwardly from the centerline and an annular segment surrounding the central segment. The central segment preferably has a positive relative refractive index profile, and the annular segment preferably has a negative relative refractive index profile. The optical fiber exhibits an effective area of greater than about 80 µm² at a wavelength of about 1550 nm, a dispersion slope of less than 0.07 ps/nm²/km at a wavelength of about 1550 nm, a zero-dispersion wavelength of between about 1290 and 1330 nm, and an attenuation of less than 0.20 dB/km, and preferably less than 0.19 dB/km, at a wavelength of about 1550 nm. Preferably, the dispersion is greater than 15 ps/nm-km, more preferably between 15 and 21 ps/nm-km, even more preferably between 16 and 20 ps/nm-km.

Preferably, the central segment has an alpha profile with an α1 preferably less than 4, more preferably less than 3, and in some preferred embodiments, α1 is between 1 and 3, and in other preferred embodiments, α1 is less than 1.

In some preferred embodiments, the annular segment surrounds and is directly adjacent to the central segment. In other preferred embodiments, the core further comprises an intermediate annular segment disposed between the central segment and the annular segment, wherein the intermediate annular segment surrounds and is directly adjacent to the central segment, and wherein the annular segment surrounds and is directly adjacent to the intermediate annular segment. Preferably, the intermediate annular segment has a relative refractive index profile having a maximum absolute magnitude, |Δ|, less than 0.05%, more preferably less than 0.02%, and even more preferably equal to 0.00%.

In preferred embodiments, the optical fiber disclosed herein has an attenuation at 1380 nm not more than 0.1 dB/km greater than an attenuation at 1310 nm. Preferably, the attenuation at 1380 nm is less than the attenuation at 1310 nm.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
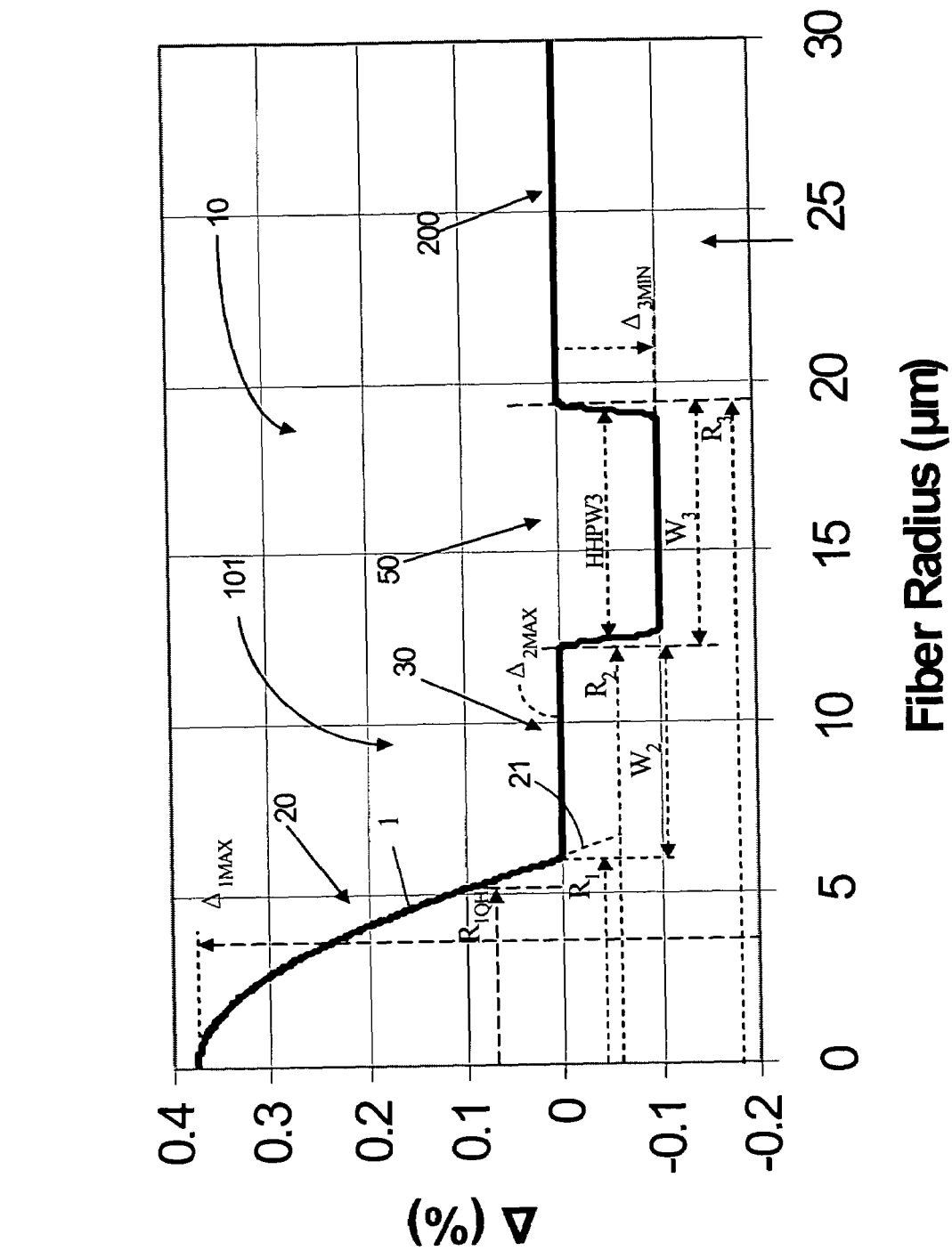
FIG. 1 shows a refractive index profile corresponding to a first set of preferred embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by Δ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r dr)^2 / (\int f^4 r dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of Δ(r) which is in units of "%", where r is radius, which follows the equation, $$\Delta(r) = \Delta(r_o)(1 - [|r - r_o|/(r_1 - r_o)]^\alpha),$$

where $r_o$ is the point at which Δ(r) is maximum, $r_1$ is the point at which Δ(r)% is zero, and r is in the range $r_i \leq r \leq r_f$, where Δ is as defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 r dr / \int [df/dr]^2 r dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r) = 0$ throughout the cladding. The core comprises a refractive index profile, $\Delta_{CORE}(r)$. The core is comprised of a plurality of core segments, each having respective refractive index profiles.

Preferably, the central segment comprises silica doped with germania, i.e. germania doped silica. Dopants other than germanium, singly or in combination, may be employed within the core, and particularly at or near the centerline, of the optical fiber disclosed herein to obtain the desired refractive index and density.

Preferably, the refractive index profile of the optical fiber disclosed herein is non-negative from the centerline to the inner radius of the annular segment, which is either $R_1$ for embodiments without an intermediate annular segment, or which is the inner radius of the annular segment is $R_2$ for embodiments with an intermediate annular segment. In preferred embodiments, the optical fiber contains no index-decreasing dopants in the central segment.

In a first group of embodiments, optical waveguide fibers 100 are disclosed herein which preferably comprise: a central segment 20 extending radially outwardly from the centerline to a central segment outer radius, $R_1$, and having a relative refractive index profile, $\Delta_1(r)$ in %, with a maximum relative refractive index percent, $\Delta_{1MAX}$; an intermediate annular segment 30 surrounding the central segment 20 and directly adjacent thereto, extending radially outwardly to an intermediate annular segment outer radius, $R_2$, having a width $W_2$ disposed at a midpoint $R_{2MID}$, and having a relative refractive index profile, $\Delta_2(r)$ in %, with a maximum absolute magnitude relative refractive index percent, $|\Delta_{2MAX}|$; an annular segment 50 surrounding the intermediate annular segment 30 and preferably directly adjacent thereto, and extending radially outwardly from $R_2$ to an annular segment outer radius, $R_3$, and having a width $W_3$ disposed at a midpoint $R_{3MID}$, and having a relative refractive index profile, $\Delta_3(r)$ in %, with a minimum relative refractive index percent, $\Delta_{3MIN}$, wherein $\Delta_{1MAX} > 0 > \Delta_{3MIN}$; and an outer annular cladding 200 surrounding the annular segment 50 and preferably directly adjacent thereto and having a relative refractive index percent, $\Delta_{CLAD}(r)$ in %. $R_1$ is defined to occur at the intersection with the horizontal $\Delta(r)=0\%$ axis of a line 21 drawn tangent to the point on $\Delta_1(r)$ corresponding to the quarter peak height ($\Delta_{1MAX}/4$) of the central segment, the quarter peak height occurring at a radius $R_{1QH}$. $R_2$ is defined to occur at the intersection with the horizontal $\Delta(r)=0\%$ axis of a line drawn tangent to the point on $\Delta_3(r)$ corresponding to an inner half peak height ($\Delta_{3MIN}/2$) of the annular segment, the inner half peak height occurring at a radius $R_{3HHI}$. The intermediate annular segment 30 begins at $R_1$ and ends at $R_2$, and the annular segment 50 begins at $R_2$ and ends at $R_3$ for this group of embodiments. $R_3$ is defined to occur at the intersection with the horizontal $\Delta(r)=0\%$ axis of a line drawn tangent to the point on $\Delta_3(r)$ corresponding to an outer half peak height ($\Delta_{3MIN}/2$) of the annular segment, the outer half peak height occurring at a radius $R_{3HHO}$. The half-height peak width of the annular segment, HHPW3, is $R_{3HHO}-R_{3HHI}$, and the midpoint of the half-height peak width of the annular segment, $R_{3HHMID}$, is $(R_{3HHI}+R_{3HHO})/2$. The width $W_3$ of the annular segment is $R_3-R_2$ and its midpoint $R_{3MID}$ is $(R_2+R_3)/2$. Preferably, more than 90% of the radial width of the central segment has a positive relative refractive index, more preferably $\Delta_1(r)$ is positive for all radii from 0 to $R_1$. Preferably, $|\Delta_{2MAX}|<0.05\%$, more preferably $|\Delta_{2MAX}|<0.025\%$, and even more preferably $|\Delta_{2MAX}|=0.0\%$ for more than 90% of the radial width of the intermediate annular segment, even more preferably for all radii from $R_1$ to $R_2$. Preferably, more than 90% of the radial width of the annular segment has a negative relative refractive index, more preferably $\Delta_3(r)$ is negative for all radii from $R_1$ to $R_3$. Preferably, $\Delta_{CLAD}(r)$ is zero for all radii from $R_3$ to the outermost radius of the cladding 200, i.e. the outermost diameter of the silica-based part of the optical fiber (excluding any coating). The core ends and the cladding begins at a radius $r_{CORE}$, and preferably $R_{CORE}=R_3$.

In a second group of embodiments, optical waveguide fibers 100 are disclosed herein which preferably comprise: a central segment 20 extending radially outwardly from the centerline to a central segment outer radius, $R_1$, and having a relative refractive index profile, $\Delta_1(r)$ in %, with a maximum relative refractive index percent, $\Delta_{1MAX}$; a first annular segment (or moat) 30 surrounding the central segment 20 and directly adjacent thereto, extending radially outwardly to a first annular segment outer radius, $R_2$, having a width $W_2$ disposed at a midpoint $R_{2MID}$, and having a non-negative relative refractive index percent, $\Delta_2\%(r)$ with a minimum relative refractive index percent, $\Delta_{2MIN}$, where $\Delta_2\%(r) \geq 0$; an annular segment 50 surrounding the central segment 20 and preferably directly adjacent thereto, and extending radially outwardly from $R_1$ to an annular segment outer radius, $R_3$, and having a width $W_3$ disposed at a midpoint $R_{3MID}$, and having a relative refractive index profile, $\Delta_3(r)$ in %, with a minimum relative refractive index percent, $\Delta_{3MIN}$, wherein $\Delta_{1MAX} > 0 > \Delta_{3MIN}$; and an outer annular cladding 200 surrounding the annular segment 50 and preferably directly adjacent thereto and having a relative refractive index percent, $\Delta_{CLAD}(r)$ in %. $R_1$ is defined to occur at the intersection with the horizontal $\Delta(r)=0\%$ axis of a line 21 drawn tangent to the point on $\Delta_1(r)$ corresponding to the quarter peak height ($\Delta_{1MAX}/4$) of the central segment, the quarter peak height occurring at a radius $R_{1QH}$. The annular segment 50 begins at a radius $R_2$, wherein $R_2=R_1$ for this group of embodiments. $R_3$ is defined to occur at the intersection with the horizontal $\Delta(r)=0\%$ axis of a line drawn tangent to the point on $\Delta_3(r)$ corresponding to an outer half peak height ($\Delta_{3MIN}/2$) of the annular segment, the outer half peak height occurring at a radius $R_{3HHO}$. An inner half peak height ($\Delta_{3MIN}/2$) of the annular segment occurs at a radius $R_{3HHI}$. The half-height peak width of the annular segment, HHPW3, is $R_{3HHO}-R_{3HHI}$, and the midpoint of the half-height peak width of the annular segment, $R_{3HHMID}$, is $(R_{3HHI}+R_{3HHO})/2$. The width $W_3$ of the annular segment is $R_3-R_2$ and its midpoint $R_{3MID}$ is $(R_2+R_3)/2$. Preferably, more than 90% of the radial width of the central segment has a positive relative refractive index, more preferably $\Delta_1(r)$ is positive for all radii from 0 to $R_1$. Preferably, more than 90% of the radial width of the annular segment has a negative relative refractive index, more preferably $\Delta_3(r)$ is negative for all radii from $R_1$ to $R_3$. Preferably, $\Delta_{CLAD}(r)$ is zero for all radii from $R_3$ to the outermost radius of the cladding 200, i.e. the outermost diameter of the silica-based part of the optical fiber (excluding any coating). The core ends and the cladding begins at a radius $r_{CORE}$, and preferably $R_{CORE}=R_3$.

In some embodiments, the central segment of the core may comprise a relative refractive index profile having a so-called centerline dip which may occur as a result of one or more optical fiber manufacturing techniques. For example, the central segment may have local minimum in the refractive index profile at radii less than 1 μm, wherein higher values for the relative refractive index (including the maximum relative refractive index for the core segment) occur at radii greater than r=0 μm. However, the centerline dip in any of the refractive index profiles disclosed herein is optional.

1st Set of Preferred Embodiments

Tables 1–2 list characteristics of an illustrative first set of preferred embodiments, Examples 1–6. FIG. 1 shows the refractive index profiles corresponding to Examples 1–6, labeled as curve 1.

TABLE 1

| | | \multicolumn{6}{c}{Example} |
|---|---|---|---|---|---|---|---|
| | | 1 | 2 | 3 | 4 | 5 | 6 |
| $\Delta_{1MAX}$ | % | 0.38 | 0.40 | 0.35 | 0.37 | 0.37 | 0.36 |
| $R_{1QH}$ | μm | 5.2 | 5.1 | 5.4 | 4.8 | 5.8 | 5 |
| $R_1$ | μm | 6.1 | 5.9 | 6.3 | 5.5 | 6.8 | 5.8 |
| $\alpha_1$ | | 2 | 2 | 2 | 2 | 2 | 2 |
| $|\Delta_2|_{MAX}$ | % | 0 | 0 | 0 | 0 | 0 | 0 |
| $R_2$ | μm | 12.3 | 12.2 | 12.6 | 11.5 | 13.4 | 13.3 |
| $W_2$ | μm | 6.2 | 6.3 | 6.3 | 6 | 6.6 | 7.5 |
| $R_{2MID}$ | μm | 9.2 | 9.05 | 9.45 | 8.5 | 10.1 | 9.55 |
| $\Delta_{3MIN}$ | % | −0.1 | −0.1 | −0.1 | −0.1 | −0.1 | −0.1 |
| $R_{3HHI}$ | μm | 12.5 | 12.3 | 12.7 | 11.6 | 13.5 | 13.4 |
| $R_{3HHO}$ | μm | 19.2 | 19.5 | 19.5 | 18.7 | 20.5 | 20.5 |
| HHPW3 | μm | 6.7 | 7.2 | 6.8 | 7.1 | 7 | 7.1 |
| $R_{3HHMID}$ | μm | 15.85 | 15.9 | 16.1 | 15.15 | 17 | 16.95 |
| $R_3 = R_{CORE}$ | μm | 19.3 | 19.6 | 19.6 | 18.8 | 20.6 | 20.6 |
| $W_3$ | μm | 7 | 7.4 | 7 | 7.3 | 7.2 | 7.3 |
| $R_{3MID}$ | μm | 15.8 | 15.9 | 16.1 | 15.15 | 17 | 16.95 |

TABLE 2

| | | \multicolumn{6}{c}{Example} |
|---|---|---|---|---|---|---|---|
| | | 1 | 2 | 3 | 4 | 5 | 6 |
| Lambda Zero | nm | 1313 | 1316 | 1310 | 1324 | 1303 | 1320 |
| Dispersion @ 1310 nm | ps/nm-km | −0.3 | −0.6 | 0.0 | −1.3 | 0.6 | −0.9 |
| Slope @ 1310 nm | ps/nm²-km | 0.090 | 0.090 | 0.090 | 0.090 | 0.091 | 0.089 |
| Aeff @ 1310 nm | μm² | 69.0 | 65.1 | 73.3 | 65.3 | 74.7 | 68.8 |
| MFD @ 1310 nm | μm | 9.52 | 9.26 | 9.82 | 9.31 | 9.87 | 9.54 |
| Attenuation @ 1310 nm | dB/km | 0.333 | 0.334 | 0.332 | 0.334 | 0.332 | 0.333 |
| Dispersion @ 1550 nm | ps/nm-km | 17.4 | 17.0 | 17.7 | 16.4 | 18.5 | 16.7 |
| Slope @ 1550 nm | ps/nm²-km | 0.062 | 0.062 | 0.062 | 0.063 | 0.062 | 0.062 |
| Aeff @ 1550 nm | μm² | 88.2 | 83.6 | 93.8 | 85.7 | 93.5 | 90.0 |
| MFD @ 1550 nm | μm | 10.85 | 10.56 | 11.18 | 10.73 | 11.12 | 10.99 |
| Attenuation @ 1550 nm | dB/km | 0.187 | 0.188 | 0.187 | 0.188 | 0.187 | 0.187 |
| Pin Array @ 1550 nm | dB | 10 | 8 | 14 | 22 | 4 | 21 |
| Lateral Load @ 1550 nm | dB/m | 0.6 | 0.4 | 1.0 | 1.0 | 0.4 | 1.1 |
| Fiber Cutoff | nm | 1440 | 1448 | 1437 | 1336 | 1595 | 1373 |
| Cable Cutoff | nm | 1290 | 1298 | 1287 | 1186 | 1445 | 1223 |

The optical waveguide fiber in the first set of embodiments, such as Examples 1–6, comprises a central segment 20, an intermediate annular segment 30, and an annular segment 50. Preferably $\Delta_1(r)$ for the central segment has an α-profile, more preferably the central segment has an α-profile with an $\alpha_1$ less than 4, more preferably less than 3, even more preferably between 1 and 3, and in some preferred embodiments between 1.5 and 2.5.

$\Delta_{1MAX}$ is greater than 0.3%, preferably between 0.3 and 0.6%, more preferably between 0.3 and 0.5%, even more preferably between 0.3 and 0.4%, and $R_1$ is between 4 and 8 μm, more preferably between 5 and 7 μm. $R_2$ is between 10 and 15 μm, more preferably between 11 and 14 μm, $W_2$ is between 5 and 8 μm, more preferably between 5.5 and 7.5 μm, even more preferably between 6 and 7 μm, and $R_{2MID}$ is between 8 and 11 μm, more preferably between 8.5 and 10.5 μm, even more preferably between 9 and 10 μm. $\Delta_{3MIN}$ is less than −0.05% (that is, a greater absolute magnitude but more negative than −0.05%), preferably between −0.05% and −0.15%, more preferably between −0.07 and −0.13%. In some preferred embodiments, $\Delta_{3MIN}=-0.1\%$. $R_3$ is between 17 and 22 μm, more preferably between 18 and 21 μm, $W_3$ is between 6 and 9 μm, more preferably between 6.5 and 8.5 μm, even more preferably between 7 and 8 μm, and $R_{3MID}$ is between 14 and 19 μm, more preferably between 15 and 18 μm, even more preferably between 15 and 17 μm. The HHPW3 is between 5 and 9 μm, more preferably between 6 and 8 μm.

The first set of embodiments have: lambda zero (zero dispersion wavelength) less than 1350 nm, preferably between 1290 and 1350 nm, more preferably between 1290 and 1330; dispersion at 1310 nm between −5 and 5 ps/nm-km, and in some preferred embodiments between −3 and 3 ps/nm-km; dispersion slope at 1310 nm less than 0.10 ps/nm²-km, preferably less than 0.095 ps/nm²-km; optical effective area at 1310 nm greater than 60 μm², preferably greater than 65 μm², and in some preferred embodiments between 65 and 80 μm²; MFD at 1310 nm greater than 9 μm, and in some preferred embodiments between 9 and 10 μm; attenuation at 1310 nm of less than 0.35 dB/km, preferably less than 0.34 dB/km; dispersion at 1550 nm greater than 15 ps/nm-km, preferably between 15 and 21 ps/nm-km, more preferably between 16 and 20, and in some preferred embodiments between 16 and 19 ps/nm-km; dispersion slope at 1550 nm less than 0.07 ps/nm²-km, and in some preferred embodiments between 0.060 and 0.070 ps/nm²-km; optical effective area at 1550 nm greater than 75 μm², preferably greater than 80 μm², and in some preferred embodiments between 80 and 100 μm²; MFD at 1550 nm greater than 10 μm, preferably greater than 10.5 μm, and in some preferred embodiments between 10.5 and 11.5 μm; attenuation at 1550 nm of less than 0.20 dB/km, preferably less than 0.19 dB/km; cable cutoff less than 1500 nm, preferably less than 1400 nm, more preferably less than 1300 nm, and in some preferred embodiments between 1280 and 1300 nm. Preferably, the pin array loss at 1550 nm is less than 25 dB, more preferably less than 20 dB, even more preferably less than 15 dB, and in some preferred embodiments less than 10 dB. Preferably the lateral load loss at 1550 nm is less than 2 dB/m, more preferably less than 1 dB/m, and in some preferred embodiments less than 0.5 dB/m. Preferably the fiber cutoff is less than 1500 nm, more preferably less than 1450 nm, and in some preferred embodiments between 1300 and 1450 nm.

2nd Set of Preferred Embodiments

Figure 2:
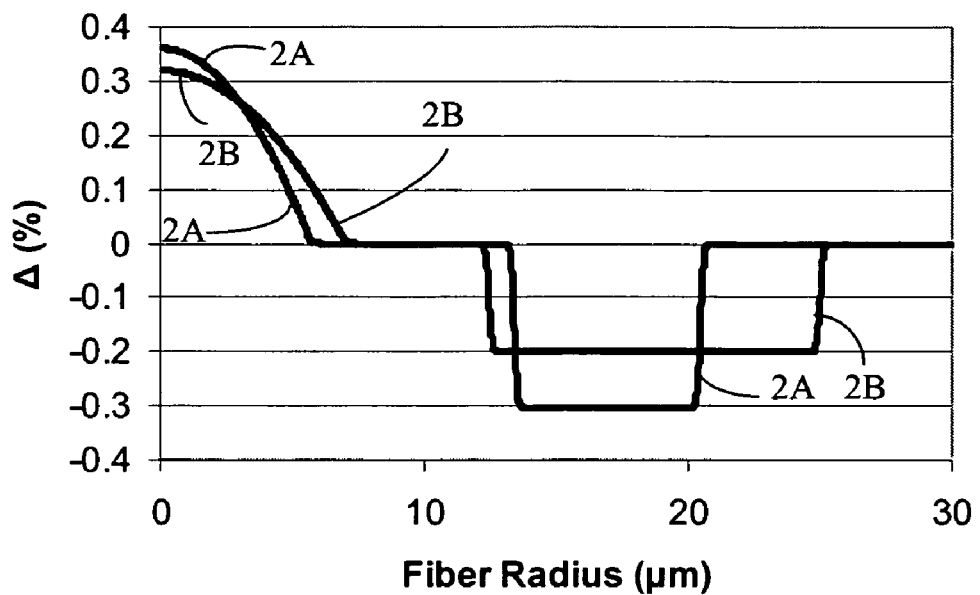
FIG. 2 shows refractive index profiles corresponding to a second set of preferred embodiments of an optical waveguide fiber as disclosed herein.

Tables 3–4 list characteristics of illustrative second set of preferred embodiments, Examples 7–8. FIG. 2 shows the refractive index profiles corresponding to Examples 7–8, labeled as curves 2A and 2B, respectively.

TABLE 3

| | | Example 7 | Example 8 |
|---|---|---|---|
| $\Delta_{1MAX}$ | % | 0.36 | 0.32 |
| $R_{1QH}$ | μm | 5 | 6 |
| $R_1$ | μm | 5.8 | 7.1 |
| $\alpha_1$ | | 2 | 2 |
| $|\Delta_2|_{MAX}$ | % | 0 | 0 |
| $R_2$ | μm | 13.3 | 12.3 |
| $W_2$ | μm | 7.5 | 5.2 |
| $R_{2MID}$ | μm | 9.55 | 9.7 |
| $\Delta_{3MIN}$ | % | −0.3 | −0.2 |
| $R_{3HHI}$ | μm | 13.5 | 12.5 |
| $R_{3HHO}$ | μm | 20.5 | 25 |
| HHPW3 | μm | 7 | 12.5 |
| $R_{3HHMID}$ | μm | 17 | 18.75 |
| $R_3 = R_{CORE}$ | μm | 20.6 | 25.1 |
| $W_3$ | μm | 7.3 | 12.8 |
| $R_{3MID}$ | μm | 16.95 | 18.7 |

TABLE 4

| | | Example 7 | Example 8 |
|---|---|---|---|
| Lambda Zero | nm | 1319 | 1301 |
| Dispersion @ 1310 nm | ps/nm-km | −0.8 | 1.0 |
| Slope @ 1310 nm | ps/nm2-km | 0.090 | 0.092 |
| Aeff @ 1310 nm | μm2 | 68.8 | 85.0 |
| MFD @ 1310 nm | μm | 9.54 | 10.54 |
| Attenuation @ 1310 nm | dB/km | 0.333 | 0.331 |
| Dispersion @ 1550 nm | ps/nm-km | 17.0 | 19.2 |
| Slope @ 1550 nm | ps/nm2-km | 0.064 | 0.064 |
| Aeff @ 1550 nm | μm2 | 89.5 | 106.2 |
| MFD @ 1550 nm | μm | 10.95 | 11.84 |
| Attenuation @ 1550 nm | dB/km | 0.187 | 0.185 |
| Pin Array @ 1550 nm | dB | 14 | 8 |
| Lateral Load @ 1550 nm | dB/m | 0.7 | 0.9 |
| Fiber Cutoff | nm | 1749 | 2008 |
| Cable Cutoff | nm | 1599 | 1858 |

The optical waveguide fiber in the second set of embodiments, such as Examples 7 and 8, comprises a central segment 20, an intermediate annular segment 30, and an annular segment 50. Preferably $\Delta_1(r)$ for the central segment has an α-profile, more preferably the central segment has an α-profile with an $\alpha_1$ less than 4, more preferably less than 3, even more preferably between 1 and 3, and in some preferred embodiments between 1.5 and 2.5.

$\Delta_{1MAX}$ is greater than 0.3%, preferably between 0.3 and 0.6%, more preferably between 0.3 and 0.5%, even more preferably between 0.3 and 0.4%, and $R_1$ is between 4 and 8 μm, more preferably between 5 and 7.5 μm. $R_2$ is between 10 and 15 μm, more preferably between 12 and 14 μm, $W_2$ is between 5 and 8 μm, and $R_{2MID}$ is between 8 and 11 μm, more preferably between 9 and 10 μm. $\Delta_{3MIN}$ is less than −0.15%, preferably between −0.15% and −0.4%, more preferably between −0.15 and −0.35%. In some preferred embodiments, $\Delta_{3MIN}$ is less than or equal to −0.2 and is greater than or equal to −0.3%. $R_3$ is between 19 and 27 μm, more preferably between 20 and 26 μm, $W_3$ is between 6 and 14 μm, more preferably between 7 and 13 μm, and $R_{3MID}$ is between 15 and 20 μm, more preferably between 16 and 19 μm. The HHPW3 is between 5 and 13 μm, more preferably between 6 and 12 μm.

The second set of embodiments have: lambda zero (zero dispersion wavelength) less than 1350 nm, preferably between 1290 and 1350 nm, more preferably between 1290 and 1330, and in some preferred embodiments between 1300 and 1320 nm; dispersion at 1310 nm between −5 and 5 ps/nm-km, preferably between −3 and 3 ps/nm-km, and in some preferred embodiments between −2 and 2 ps/nm-km; dispersion slope at 1310 nm less than 0.10 ps/nm²-km, preferably less than 0.095 ps/nm²-km; optical effective area at 1310 nm greater than 60 μm², preferably greater than 65 μm², and in some preferred embodiments greater than 80 μm², and in other preferred embodiments between 65 and 90 μm²; MFD at 1310 nm greater than 9 μm, and in some preferred embodiments between 9 and 11 μm; attenuation at 1310 nm of less than 0.35 dB/km, preferably less than 0.34 dB/km; dispersion at 1550 nm greater than 15 ps/nm-km, preferably between 15 and 21 ps/nm-km, more preferably between 16 and 20, and in some preferred embodiments between 17 and 19.5 ps/nm-km; dispersion slope at 1550 nm less than 0.07 ps/nm²-km, and in some preferred embodiments between 0.060 and 0.070 ps/nm²-km; optical effective area at 1550 nm greater than 75 μm², preferably greater than 80 μm², more preferably greater than 85 μm², and in some preferred embodiments between 85 and 110 μm²; MFD at 1550 nm greater than 10 μm, preferably greater than 10.5 μm, and in some preferred embodiments between 10.5 and 12 μm; attenuation at 1550 nm of less than 0.20 dB/km, preferably less than 0.19 dB/km. In some embodiments, the cable cutoff is less than 1900 nm, and in other embodiments less than 1600 nm. Preferably, the pin array loss at 1550 nm is less than 25 dB, more preferably less than 20 dB, even more preferably less than 15 dB, and in some preferred embodiments less than 10 dB. Preferably the lateral load loss at 1550 nm is less than 2 dB/m, more preferably less than 1 dB/m. Preferably the fiber cutoff is less than 1800 nm, more preferably less than 1700 nm.

3rd and 4th Sets of Preferred Embodiments

Figure 3:
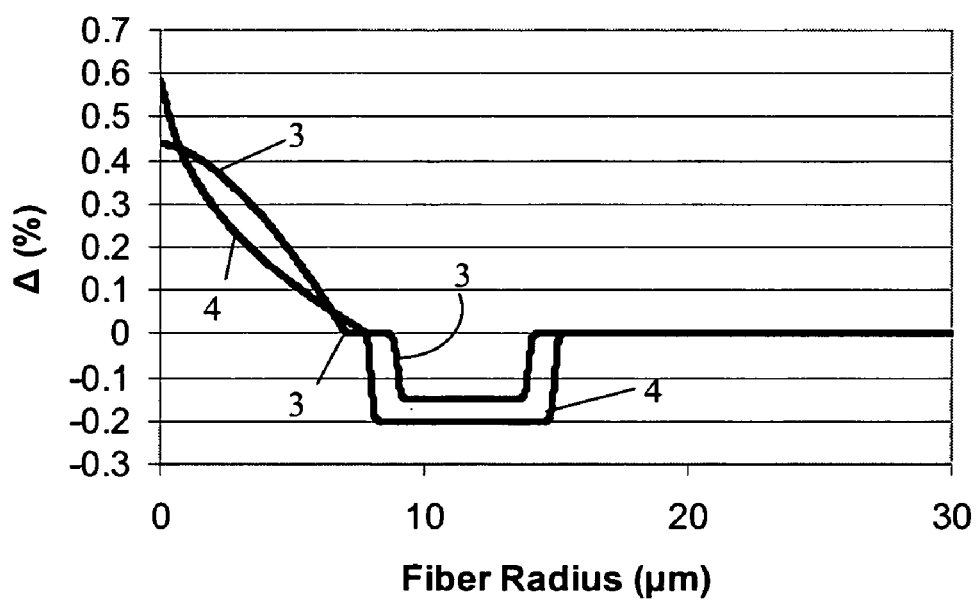
FIG. 3 shows refractive index profiles corresponding to third and fourth sets5 of preferred embodiments of an optical waveguide fiber as disclosed herein.

An illustrative third set of preferred embodiments is represented by Example 9 in Tables 5–6 and by the refractive index profile labeled curve 3 in FIG. 3. An illustrative fourth set of preferred embodiments is represented by Example 10 in Tables 5–6 and by the refractive index profile labeled curve 4 in FIG. 3.

TABLE 5

| | | Example 9 | Example 10 |
|---|---|---|---|
| $\Delta_{1MAX}$ | % | 0.44 | 0.58 |
| $R_{1QH}$ | μm | 5.9 | 4.4 |
| $R_1$ | μm | 7.1 | 7.3 |
| $\alpha_1$ | | 1.6 | 0.4 |
| $|\Delta_2|_{MAX}$ | % | 0 | (n/a) |
| $R_2$ | μm | 8.9 | 7.3 |
| $W_2$ | μm | 1.8 | 0 |
| $R_{2MID}$ | μm | 8 | 7.3 |
| $\Delta_{3MIN}$ | % | −0.15 | −0.2 |
| $R_{3HHI}$ | μm | 9 | 8 |
| $R_{3HHO}$ | μm | 14 | 15 |
| HHPW3 | μm | 5 | 7 |
| $R_{3HHMID}$ | μm | 11.5 | 11.5 |
| $R_3 = R_{CORE}$ | μm | 14.1 | 15.1 |
| $W_3$ | μm | 5.2 | 7.8 |
| $R_{3MID}$ | μm | 11.5 | 11.2 |

TABLE 6

| | | Example | |
|---|---|---|---|
| | | 9 | 10 |
| Lambda Zero | nm | 1301 | 1318 |
| Dispersion @ 1310 nm | ps/nm-km | 0.8 | −0.8 |
| Slope @ 1310 nm | ps/nm2-km | 0.094 | 0.099 |
| Aeff @ 1310 nm | μm2 | 68.3 | 65.9 |
| MFD @ 1310 nm | μm | 9.43 | 9.37 |
| Attenuation @ 1310 nm | dB/km | 0.332 | 0.331 |
| Dispersion @ 1550 nm | ps/nm-km | 19.3 | 18.6 |
| Slope @ 1550 nm | ps/nm2-km | 0.064 | 0.067 |
| Aeff @ 1550 nm | μm2 | 84.2 | 84.8 |
| MFD @ 1550 nm | μm | 10.51 | 10.61 |
| Attenuation @ 1550 nm | dB/km | 0.187 | 0.186 |
| Pin Array @ 1550 nm | dB | 1 | 19 |
| Lateral Load @ 1550 nm | dB/m | 0.1 | 0.8 |
| Fiber Cutoff | nm | 1627 | 1516 |
| Cable Cutoff | nm | 1477 | 1366 |

The optical waveguide fiber in the third set of embodiments, such as Example 9, comprises a central segment 20, an intermediate annular segment 30, and an annular segment 50. Preferably $\Delta_1(r)$ for the central segment has an α-profile, more preferably the central segment has an α-profile with an $\alpha_1$ less than 3, more preferably less than 2, even more preferably between 1 and 2, and in some preferred embodiments between 1.4 and 1.8.

$\Delta_{1MAX}$ is greater than 0.3%, preferably greater than 0.4%, more preferably between 0.4 and 0.5%, and $R_1$ is between 6 and 8 μm. $R_2$ is between 8 and 10 μm, $W_2$ is between 1 and 3 μm, and $R_{2MID}$ is between 7 and 9 μm. $\Delta_{3MIN}$ is less than −0.1%, preferably between −0.1% and −0.2%. $R_3$ is between 11 and 17 μm, more preferably between 13 and 15 μm, $W_3$ is between 3 and 7 μm, more preferably between 4 and 6 μm, and $R_{3MID}$ is between 10 and 13 μm, more preferably between 11 and 12 μm. The HHPW3 is between 4 and 6 μm.

The third set of embodiments have: lambda zero (zero dispersion wavelength) less than 1350 nm, preferably between 1290 and 1350 nm, more preferably between 1290 and 1330; dispersion at 1310 nm between −5 and 5 ps/nm-km, preferably between −3 and 3 ps/nm-km, and in some preferred embodiments between −2 and 2 ps/nm-km; dispersion slope at 1310 nm less than 0.10 ps/nm²-km, preferably less than 0.095 ps/nm²-km; optical effective area at 1310 nm greater than 60 μm², preferably greater than 65 μm²; MFD at 1310 nm greater than 9 μm, and in some preferred embodiments between 9 and 11 μm; attenuation at 1310 nm of less than 0.35 dB/km, preferably less than 0.34 dB/km; dispersion at 1550 nm greater than 15 ps/nm-km, preferably between 15 and 21 ps/nm-km, more preferably between 16 and 20; dispersion slope at 1550 nm less than 0.07 ps/nm²-km, and in some preferred embodiments between 0.060 and 0.070 ps/nm²-km; optical effective area at 1550 nm greater than 75 μm², preferably greater than 80 μm², and in some preferred embodiments between 85 and 95 μm²; MFD at 1550 nm greater than 10 μm, and in some preferred embodiments between 10 and 11 μm; attenuation at 1550 nm of less than 0.20 dB/km, preferably less than 0.19 dB/km. In some embodiments, the cable cutoff is less than 1500 nm, and in other embodiments between 1300 and 1500 nm. Preferably, the pin array loss at 1550 nm is less than 25 dB, more preferably less than 20 dB, even more preferably less than 15 dB, still more preferably less than 10 dB, and in some preferred embodiments less than 5 dB. Preferably the lateral load loss at 1550 nm is less than 2 dB/m, more preferably less than 1 dB/m. Preferably the fiber cutoff is less than 1650, more preferably less than 1550 nm.

The optical waveguide fiber in the fourth set of embodiments, such as Example 10, comprises a central segment 20 and an annular segment 50 surrounding and directly adjacent to the central segment 20. Preferably $\Delta_1(r)$ for the central segment has an α-profile, more preferably the central segment has an α-profile with an $\alpha_1$ less than 1, even more preferably between 0.1 and 1, still more preferably between 0.25 and 0.75, and in some preferred embodiments between 0.3 and 0.6.

$\Delta_{1MAX}$ is greater than 0.4%, preferably greater than 0.5%, more preferably between 0.5 and 0.65%, and $R_1$ is between 6 and 8 μm. $R_2$ is between 6 and 9 μm, preferably between 7 and 8 μm. $W_2$ is 0 because an intermediate annular segment is absent. $\Delta_{3MIN}$ is less than −0.1%, preferably between −0.1% and −0.3%. $R_3$ is between 12 and 18 μm, more preferably between 14 and 16 μm, $W_3$ is between 6 and 9 μm, more preferably between 7 and 8 μm, and $R_{3MID}$ is between 10 and 12 μm, more preferably between 11 and 12 μm. The HHPW3 is between 6 and 8 μm.

The fourth set of embodiments have: lambda zero (zero dispersion wavelength) less than 13550 n, preferably between 1290 and 1350 nm, more preferably between 1290 and 1330; dispersion at 1310 nm between −5 and 5 ps/nm-km, preferably between −3 and 3 ps/nm-km, and in some preferred embodiments between −2 and 2 ps/nm-km; dispersion slope at 1310 nm less than 0.10 ps/nm²-km; optical effective area at 1310 nm greater than 60 μm², preferably greater than 65 μm²; MFD at 1310 nm greater than 9 μm; attenuation at 1310 nm of less than 0.35 dB/km, preferably less than 0.34 dB/km; dispersion at 1550 nm greater than 15 ps/nm-km, preferably between 15 and 21 ps/nm-km, more preferably between 16 and 20; dispersion slope at 1550 nm less than 0.07 ps/nm²-km, and in some preferred embodiments between 0.060 and 0.070 ps/nm²-km; optical effective area at 1550 nm greater than 75 μm², preferably greater than 80 μm², and in some preferred embodiments between 80 and 95 μm²; MFD at 1550 nm greater than 10 μm, and in some preferred embodiments between 10 and 11 μm; attenuation at 1550 nm of less than 0.20 dB/km, preferably less than 0.19 dB/km. In some embodiments, the cable cutoff is less than 1500 nm, and in other embodiments between 1300 and 1500 nm. Preferably, the pin array loss at 1550 nm is less than 25 dB, more preferably less than 20 dB. Preferably the lateral load loss at 1550 nm is less than 2 dB/m, more preferably less than 1 dB/m. Preferably the fiber cutoff is less than 1650, more preferably less than 1550 nm.

Optical waveguide fibers are disclosed herein comprising: a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.3%; an annular segment surrounding the central core region and extending to a radius $R_3$ and having a negative relative refractive index percent, $\Delta_3(r)$ in %, with a minimum relative refractive index percent, $\Delta_{3MIN}$; and an outer annular cladding surrounding the annular region and having a relative refractive index percent, $\Delta_c(r)$ in %; wherein $\Delta_{1MAX} > 0 > \Delta_{3MIN}$; and wherein the relative refractive index of the optical fiber is selected to provide an effective area of greater than about 75 μm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm. Preferably, the central segment has an outermost radius, $R_1$, between 4 and 8 μm. Preferably, the annular segment has a width $W_3$ between 3 and 14 μm, a midpoint $R_{3MID}$ between 10 and 20 μm, and an outermost radius $R_3$ between 11 and 27 μm. Preferably, the optical fiber has a MFD greater than about 10 μm at a wavelength of about 1550 nm. Preferably, the optical fiber has a dispersion of between −5 and 5 ps/nm-km at a wavelength of about 1310 nm, and a dispersion slope of less than 0.10 ps/nm²-km at a wavelength of about 1310 nm. Preferably, the optical fiber has an effective area of greater than 60 μm² at a wavelength of about 1310 nm, and in some preferred embodiments the effective area is greater than 80 μm² at a wavelength of about 1310 nm. Preferably, the optical fiber has an attenuation of less than 0.35 dB/km at a wavelength of about 1310 nm. Preferably, the optical fiber has a cabled cutoff wavelength of less than 1500 nm. Preferably, the pin array loss of the optical fiber is less than 25 dB.

In one subset of optical fibers, the annular segment is directly adjacent to the central segment.

In another subset, the optical fibers further comprise an intermediate annular segment disposed between the central segment and the annular segment, and preferably the intermediate annular segment surrounds and directly abuts the central segment, and preferably the annular segment surrounds and directly abuts the intermediate annular segment. Preferably, the intermediate annular segment has a maximum relative refractive index, $\Delta_{2MAX}$, wherein $|\Delta_{2MAX}|<0.05\%$. Preferably, the intermediate annular segment has a width $W_2$ between 1 and 8 μm, a midpoint $R_{2MID}$ between 7 and 11 μm, and an outermost radius, $R_2$, between 6 and 15 μm.

Preferably, the outer annular cladding directly abuts the annular region.

An optical fiber communication system is disclosed herein comprising a transmitter, a receiver, and an optical fiber transmission line comprising the optical fiber disclosed herein and a second optical fiber having a negative dispersion at a wavelength of about 1550 nm.

Optical waveguide fiber is disclosed herein comprising: a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.3%; an intermediate annular segment surrounding and directly adjacent to the central segment, wherein the intermediate annular segment has a maximum relative refractive index, $\Delta_{2MAX}$, wherein $|\Delta_{2MAX}|<0.05\%$, and wherein the intermediate annular segment has a width $W_2$ between 1 and 8 μm, a midpoint $R_{2MID}$ between 7 and 11 μm, and an outermost radius, $R_2$, between 6 and 15 μm; an annular segment surrounding and directly adjacent to the intermediate annular segment and extending to a radius $R_3$ and having a negative relative refractive index percent, $\Delta_3(r)$ in %, with a minimum relative refractive index percent, $\Delta_{3MIN}$; and an outer annular cladding surrounding the annular region and having a relative refractive index percent, $\Delta_c(r)$ in %; wherein $\Delta_{1MAX}>0>\Delta_{3MIN}$; wherein the relative refractive index of the optical fiber is selected to provide an effective area of greater than about 75 μm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

Optical waveguide fiber is also disclosed herein comprising: a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.5%; an annular segment surrounding and directly adjacent to the central segment and extending to a radius $R_3$ and having a negative relative refractive index percent, $\Delta_3(r)$ in %, with a minimum relative refractive index percent, $\Delta_{3MIN}$; and an outer annular cladding surrounding the annular region and having a relative refractive index percent, $\Delta_c(r)$ in %; wherein $\Delta_{1MAX}>0>\Delta_{3MIN}$; wherein the relative refractive index of the optical fiber is selected to provide an effective area of greater than about 75 μm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

Preferably, the optical fiber disclosed herein is capable of transmitting optical signals in the 1260 nm to 1650 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 4:
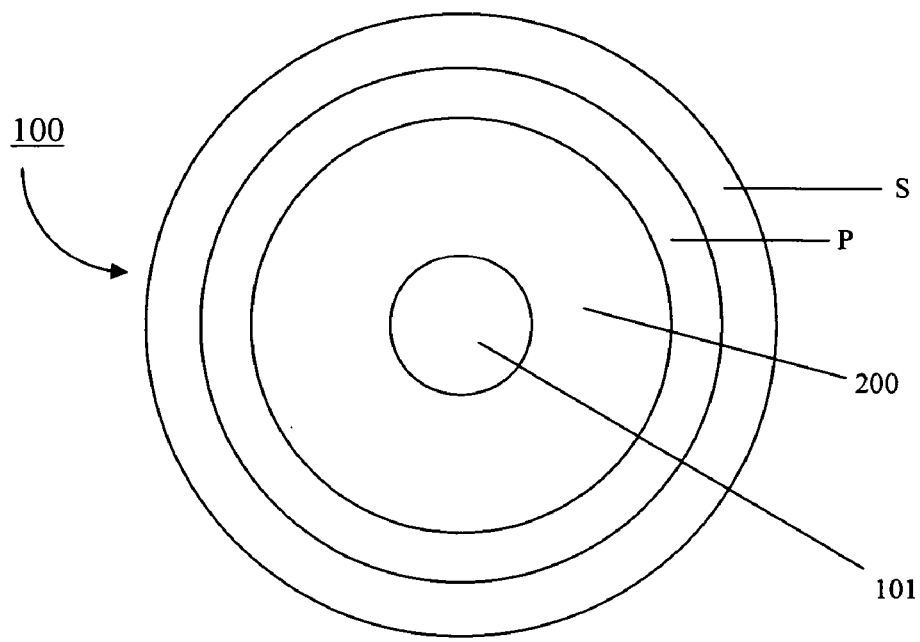
FIG. 4 is a schematic cross-sectional view of a preferred embodiment of an optical waveguide fiber as disclosed herein.

FIG. 4 is a schematic representation (not to scale) of an optical waveguide fiber 100 as disclosed herein having core 101 and an outer annular cladding or outer cladding layer or clad layer 200 directly adjacent and surrounding the core 101. The core 101 has multiple segments (not shown in FIG. 4).

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core having a $\Delta(r)=0\%$.

Preferably, the optical fiber disclosed herein has a silica-based core and cladding. In preferred embodiments, the cladding has an outer diameter, 2*Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 5:
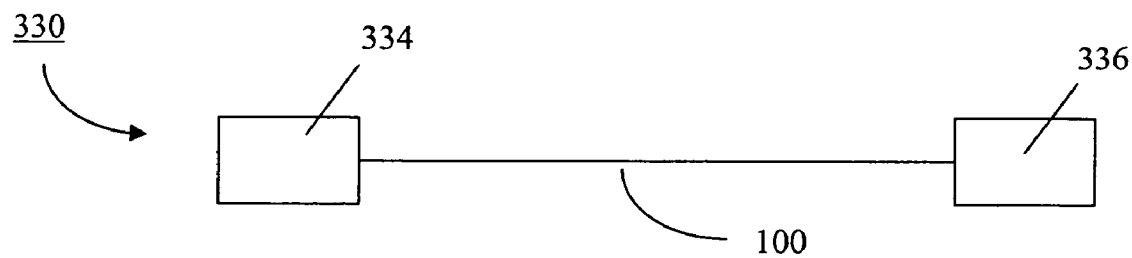
FIG. 5 is a schematic illustration of a fiber optic communication system employing an optical fiber as disclosed herein.

As shown in FIG. 5, an optical fiber 100 as disclosed herein may be implemented in an optical fiber communication system 330. System 330 includes a transmitter 334 and a receiver 336, wherein optical fiber 100 allows transmission of an optical signal between transmitter 334 and receiver 336. System 330 is preferably capable of 2-way communication, and transmitter 334 and receiver 336 are shown for illustration only. The system 330 preferably includes a link which has a section or a span of optical fiber as disclosed herein. The system 330 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Patent Application Publication No. 2002102083, and PCT Application Publication No. WO01/47822.

A soot preform or soot body is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as a hollow or tubular handle and mounted on a lathe. The lathe is designed to rotate and translate the mandrel in close proximity with a soot-generating burner. As the mandrel is rotated and translated, silica-based reaction product, known generally as soot, is directed toward the mandrel. At least a portion of silica-based reaction product is deposited on the mandrel and on a portion of the handle to form a body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing soot body to a chlorine-containing atmosphere at elevated temperature within consolidation furnace. A chlorine-containing atmosphere effectively removes water and other impurities from soot body, which otherwise would have an undesirable effect on the properties of the optical waveguide fiber manufactured from the soot body. In an OVD formed soot body, the chlorine flows sufficiently through the soot to effectively dry the entire preform, including the centerline region surrounding centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewetted by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

As described above and elsewhere herein, the plugs are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of a top plug has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. Consequently, overall lower O—H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 μm, and in particular reduced losses can be obtained in the 1383 nm water peak region thereby resulting in more efficient system operation.

The fibers disclosed herein exhibit low PMD values particularly when fabricated with OVD processes. Spinning of the optical fiber may also lower PMD values for the fiber disclosed herein.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein. The optical transmission line may also comprise a section of a second optical fiber having a negative dispersion at a wavelength of about 1550 nm, for example to effect dispersion compensation within the optical transmission line.

Figure 6:
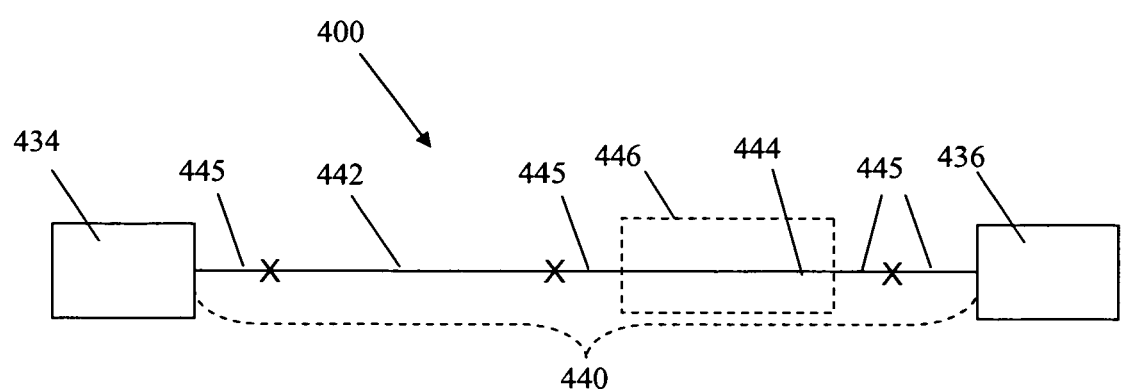
FIG. 6 schematically illustrates another embodiment of an optical fiber communication system disclosed herein.

FIG. 6 schematically illustrates another embodiment of an optical fiber communication system 400 disclosed herein. System 400 includes a transmitter 434 and a receiver 436 which are optically connected by optical transmission line 440. Optical transmission line 440 comprises a first fiber 442 which is a low attenuation large effective area optical fiber as disclosed herein, and a second optical fiber 444 having a dispersion at 1550 nm of between −70 and −150 ps/nm-km. In preferred embodiments, the second fiber has a relative refractive index profile having a central core segment with a positive relative refractive index, a moat segment surrounding and in contact with the central segment and having a negative relative refractive index, and a ring segment surrounding and in contact with the moat segment and having a positive relative refractive index. Preferably, the central segment of the second fiber has a maximum relative refractive index between 1.6% and 2%, the moat segment has a minimum relative refractive index between −0.25% and −0.44%, and the ring segment has a maximum relative refractive index between 0.2% and 0.5%. Preferably, the central segment of the second fiber has an outer radius of between 1.5 and 2 μm, the moat segment has an outer radius of between 4 and 5 μm, and the ring segment has a midpoint between 6 and 7 μm. An example of a second fiber is described in U.S. Patent Application Publication No. 2003/0053780, Ser. No. 10/184,377 published on Mar. 20, 2003, such as depicted in FIG. 4 or FIG. 6 therein. The first fiber 442 and second fiber 444 may be optically connected by a fusion splice, an optical connector or the like, as depicted by the symbol "X" in FIG. 6. Preferably, the kappa of the first fiber, k1, is matched to the kappa of the second fiber, k2, wherein k1/k2 is preferably between 0.8 and 1.2, more preferably between 0.9 and 1.1, and even more preferably between 0.95 and 1.05. The optical transmission line 440 may also comprise one or more components and/or other optical fiber(s) (for example one or more "pigtail fibers" 445 at junctions between fibers and/or components). In preferred embodiments, at least a portion of the second optical fiber 444 is optionally disposed within a dispersion compensating module 446. Optical transmission line 440 allows transmission of an optical signal between transmitter 434 and receiver 436. Preferably, the residual dispersion in the optical transmission line is less than about 5 ps/nm per 100 km of fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 and 1565 nm.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising:
a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.3%;
an annular segment surrounding the central segment and extending to a radius $R_3$ and having a negative relative refractive index percent, $\Delta_3(r)$ in %, with a minimum relative refractive index percent, $\Delta_{3MIN}$; and
an outer annular cladding surrounding the annular segment and having a relative refractive index percent, $\Delta_c(r)$ in %;
wherein $\Delta_{1MAX}>0>\Delta_{3MIN}$;
wherein the relative refractive index of the optical fiber is selected to provide an effective area of greater than about 75 μm² and less than 100 μm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

2. The optical fiber of claim 1 wherein the annular segment is directly adjacent to the central segment.

3. The optical fiber of claim 1 wherein the central segment has an outermost radius, $R_1$, between 4 and 8 μm.

4. The optical fiber of claim 1 wherein the annular segment has a width $W_3$ between 3 and 14 μm, a midpoint $R_{3MID}$ between 10 and 20 μm, and an outermost radius $R_3$ between 11 and 27 μm.

5. The optical fiber of claim 1 wherein the optical fiber has a MFD greater than about 10 μm at a wavelength of about 1550 nm.

6. The optical fiber of claim 1 wherein the optical fiber has a dispersion of between −5 and 5 ps/nm-km at a wavelength of about 1310 nm, and a dispersion slope of less than 0.10 ps/nm²-km at a wavelength of about 1310 nm.

7. The optical fiber of claim 1 wherein the optical fiber has an effective area of greater than 60 μm² at a wavelength of about 1310 nm.

8. The optical fiber of claim 1 wherein the optical fiber has an effective area of greater than 80 μm² at a wavelength of about 1310 nm.

9. The optical fiber of claim 1 wherein the optical fiber has an attenuation of less than 0.35 dB/km at a wavelength of about 1310 nm.

10. The optical fiber of claim 1 wherein the optical fiber has a cabled cutoff wavelength of less than 1500 nm.

11. The optical fiber of claim 1 wherein the pin array loss of the optical fiber is less than 25 dB.

12. The optical fiber of claim 1 further comprising an intermediate annular segment disposed between the central segment and the annular segment, wherein the intermediate annular segment surrounds and directly abuts the central segment.

13. The optical fiber of claim 12 wherein the annular segment surrounds and directly abuts the intermediate annular segment.

14. The optical fiber of claim 12 wherein the intermediate annular segment has a maximum relative refractive index, $\Delta_{2MAX}$, wherein $|\Delta_{2MAX}|<0.05\%$.

15. The optical fiber of claim 12 wherein the intermediate annular segment has a width $W_2$ between 1 and 8 μm, a midpoint $R_{2MID}$ between 7 and 11 μm, and an outermost radius, $R_2$, between 6 and 15 μm.

16. The optical fiber of claim 1 wherein the optical fiber has an attenuation at 1380 nm not more than 0.1 dB/km greater than an attenuation at 1310 nm.

17. The optical fiber of claim 1 wherein the outer annular cladding directly abuts the annular segment.

18. An optical fiber communication system comprising a transmitter, a receiver, and an optical fiber transmission line comprising the optical fiber of claim 1 and a second optical fiber having a negative dispersion at a wavelength of about 1550 nm.

19. The optical fiber of claim 1 wherein the effective area is greater than 75 μm² and less than 100 μm² at a wavelength of 1550 nm.

20. An optical waveguide fiber comprising:
a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.3%;
an intermediate annular segment surrounding and directly adjacent to the central segment, wherein the intermediate annular segment has a maximum relative refractive index, $\Delta_{2MAX}$, wherein $|\Delta_{2MAX}|<0.05\%$, and wherein the intermediate annular segment has a width $W_2$ between 1 and 8 μm, a midpoint $R_{2MID}$ between 7 and 11 μm, and an outermost radius, $R_2$, between 6 and 15 μm;
an annular segment surrounding and directly adjacent to the intermediate annular segment and extending to a radius $R_3$ and having a negative relative refractive index percent, $\Delta_3(r)$ in %, with a minimum relative refractive index percent, $\Delta_{3MIN}$; and
an outer annular cladding surrounding the annular segment and having a relative refractive index percent, $\Delta_c(r)$ in %;
wherein $\Delta_{1MAX}>0>\Delta_{3MIN}$;
wherein the relative refractive index of the optical fiber is selected to provide an effective area of greater than about 75 μm² and less than 100 μm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

21. The optical fiber of claim 20 wherein the effective area is greater than 75 μm² and less than 100 μm² at a wavelength of 1550 nm.

22. An optical waveguide fiber comprising:
a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.5%;
an annular segment surrounding and directly adjacent to the central segment and extending to a radius $R_3$ and having a negative relative refractive index percent, $\Delta_3(r)$ in %, with a minimum relative refractive index percent, $\Delta_{3MIN}$; and an outer annular cladding surrounding the annular segment and having a relative refractive index percent, $\Delta_c(r)$ in %;

wherein $\Delta_{1MAX} > 0 > \Delta_{3MIN}$;

wherein the relative refractive index of the optical fiber is selected to provide an effective area of greater than about 75 µm² and less than 100 µm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

23. The optical fiber of claim 22 wherein the effective area is greater than 75 µm² and less than 100 µm² at a wavelength of 1550 nm.

24. An optical waveguide fiber comprising:

a central segment extending radially outwardly from a centerline to a radius $R_1$ and having a positive relative refractive index percent, $\Delta_1(r)$ in %, wherein the central segment has a maximum relative refractive index percent, $\Delta_{1MAX}$, greater than 0.3%;

an intermediate annular segment surrounding and directly adjacent to the central segment, wherein the intermediate annular segment has a maximum relative refractive index, $\Delta_{2MAX}$, wherein $|\Delta_{2MAX}| = 0.00\%$;

an annular segment surrounding and directly adjacent to the intermediate annular segment and extending to a radius $R_3$ and having a negative relative refractive index percent, $\Delta_3(r)$ in %, with a minimum relative refractive index percent, $\Delta_{3MIN}$; and an outer annular cladding surrounding the annular segment and having a relative refractive index percent, $\Delta_c(r)$ in %;

wherein $\Delta_{1MAX} > 0 > \Delta_{3MIN}$;

wherein the relative refractive index of the optical fiber is selected to provide an effective area of greater than about 75 µm² at a wavelength of about 1550 nm, a dispersion slope of less than 0.07 ps/nm²/km at a wavelength of about 1550 nm, a zero-dispersion wavelength of less than 1350 nm, and an attenuation of less than 0.20 dB/km at a wavelength of about 1550 nm.

25. The optical fiber of claim 24 wherein the effective area is greater than 75 µm² and less than 100 µm² at a wavelength of 1550 nm.

26. The optical fiber of claim 24 wherein the intermediate annular segment has a width $W_2$ between 1 and 8 µm, a midpoint $R_{2MID}$ between 7 and 11 µm, and an outermost radius, $R_2$, between 6 and 15 µm.

27. The optical fiber of claim 12 wherein the intermediate annular segment has a width $W_2$ between 1 and 8 µm.

28. The optical fiber of claim 12 wherein the intermediate annular segment has a midpoint $R_{2MID}$ between 7 and 11 µm.

29. The optical fiber of claim 12 wherein the intermediate annular segment has an outermost radius, $R_2$, between 6 and 15 µm.

30. The optical fiber of claim 12 wherein the optical fiber has an attenuation of less than 0.19 dB/km at a wavelength of about 1550 nm.

31. The optical fiber of claim 1 wherein the optical fiber has an attenuation of less than 0.19 dB/km at a wavelength of about 1550 nm.

* * * * *